No. 844,364. PATENTED FEB. 19, 1907.
E. G. KIMMELL.
ROTARY MEASURING DEVICE.
APPLICATION FILED DEC. 1, 1906.
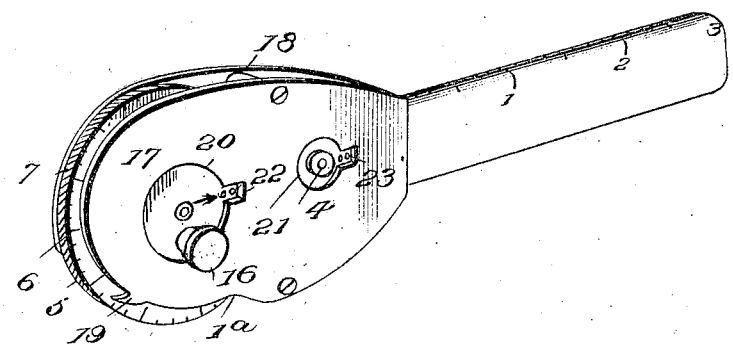
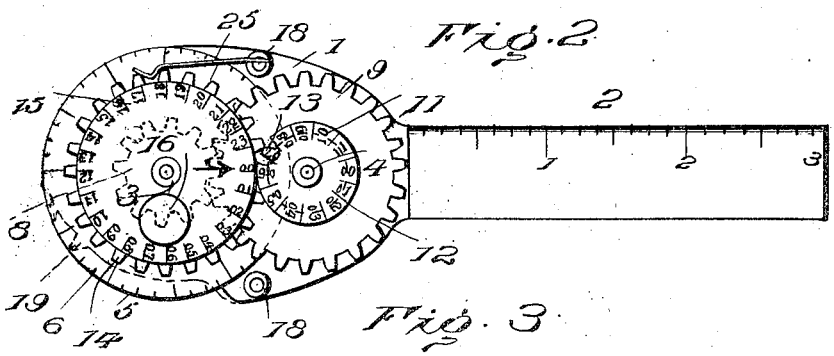
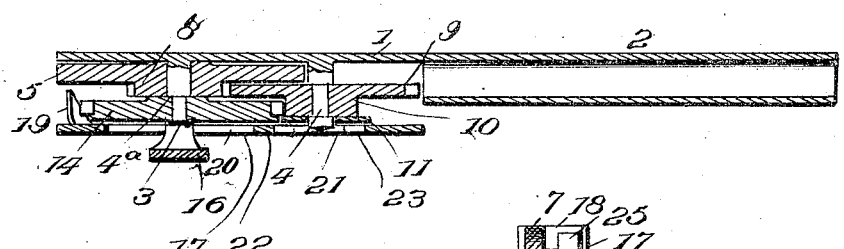
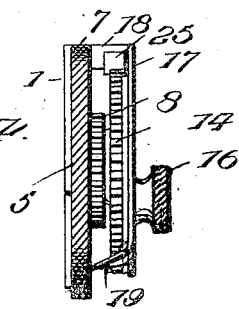
Witnesses
Inventor
E. G. Kimmell
By
Attorneys

UNITED STATES PATENT OFFICE.

EDWARD G. KIMMELL, OF KEYSER, WEST VIRGINIA.

ROTARY MEASURING DEVICE.

No. 844,364.     Specification of Letters Patent.     Patented Feb. 19, 1907.

Application filed December 1, 1906. Serial No. 345,952.

*To all whom it may concern:*

Be it known that I, EDWARD G. KIMMELL, citizen of the United States, residing at Keyser, in the county of Mineral and State of West Virginia, have invented certain new and useful Improvements in Rotary Measuring Devices, of which the following is a specification.

This invention contemplates certain new and useful improvements in rotary measuring devices designed to measure peripheries or circumferential surfaces, as well as to effect linear measurement, and used by lumbermen for measuring lumber and for mechanics in general for measuring shafting and the like.

The object of my invention is to provide a simple and durable construction of device of this character which is composed of comparatively few parts which may be cheaply manufactured and readily assembled; and the invention consists in certain constructions and arrangements of the parts hereinafter described and claimed.

For a full description of the invention and the merits thereof and also to acquire a knowledge of the details of construction and the means for effecting the result, reference is to be had to the following description and accompanying drawings, in which—

Figure 1 is a perspective view of my improved rotary measuring device. Fig. 2 is a face view, the plate being removed. Fig. 3 is a horizontal sectional view. Fig. 4 is an end view.

Corresponding and like parts are referred to in the following description and indicated in all the views of the drawings by the same reference characters.

Referring to the drawings, the numeral 1 designates the base-plate of my device, which is preferably formed of metal and which is provided with an integral handle 2, that may be formed by curling the side edges of the blank out of which the side edges are formed over and upon each other, as indicated in the drawings.

3 and 4 designate posts that project out from the face of the base-plate 1, the post 4 being provided with an outwardly-facing shoulder 4ª.

5 designates the measuring-wheel, which is centrally journaled upon the post 3 and which is provided with graduations 6 on its outer face and with a milled periphery 7. In the present instance the wheel 5 is six inches in circumference and is graduated into inches and fractions thereof.

The measuring-wheel 5 is provided with a fast pinion 8, which meshes with a larger spur-wheel 9, journaled upon the post 4 and resting upon the shoulder 4ª thereof, so that the said spur-wheel is journaled in a spaced relation to the base-plate and permits the measuring-wheel 5 to extend underneath it or between it and the base-plate, so as to bring the toothed peripheries of the pinions 8 and spur-wheel 9 into mesh with each other. The spur-wheel 9 is provided with a collar 10, which is secured thereto or formed integrally therewith, and said collar supports a ring 11, the outer surface of which contains a series of numbers, as indicated at 12,—that is, numbers running from zero around to eleven in the present instance and divided into twelve different spaces representing twelve inches, or one foot.

The collar 10 of the spur-wheel 9 is provided with a lug 13, which constitutes a tappet designed to strike the teeth of a spur-wheel 14, which is mounted on the post 3 above the pinion 8. The spur-wheel 14 contains on its outer face graduations 15, running from zero to 24 and each of these indicating one foot.

16 designates a knurled head which is formed on the outer face of the spur-wheel 14 and by which the operator will turn the wheel 14 to bring it back to the zero-point.

A cover-plate 17 is adapted to be secured to the base-plate 1, so as to form a casing for the wheels of the device, and the covering-plate is secured to the base-plate preferably by means of studs 18, which are provided with sockets at their outer ends for insertion of screws, which extend through the cover-plate, as shown. The cover-plate is provided with a pointer 19, which is in the form of an offset-lug adapted to extend into close proximity to the graduations on the outer face of the measuring-wheel 5 and intended to indicate the starting and stopping points. The cover-plate 17 is provided with two openings 20 and 21, one for the spur-wheel 14 and the other for the ring 11, both of which constitute indicating-disks, and from these openings lead side slots 22 and 23, respectively, adapted to expose the numerals of the said two indicating-disks.

25 designates a detent-spring which is slightly crimped at its free end, so as to lie between the teeth of the spur-wheel 14 and act as a detent thereon to prevent the too-free rotation of said spur-wheel, and said spring is preferably held in place by having its other end inserted through a slot in one of the studs 18, being secured in said stud in any desired manner.

The base-plate 1 is provided with a cut-away portion or recess 1ª, so as to expose the periphery of the measuring-wheel 5. The handle 2 is provided with graduations of a linear scale, three inches being shown in the present instance, and this is provided so that in measuring lumber or the like upon a floor or where it is desired to measure close into a corner the said handle may be used as a measuring means at the corner, where the rotary portion of the device could not be utilized.

In the practical use of my improved measuring rotary device the two measuring-disks that are constituted by the spur-wheel 14 and ring 11 are turned around, so as to bring their zero-marks at the side openings 22 and 23. The tool is then placed in vertical position, with the periphery of the measuring-wheel 5 on the surface to be measured and with the pointer 19 at the starting-point. The measuring-wheel is then run along the surface to be measured, and the pinion 8 is so proportioned to the spur-wheel 9 that as every inch is measured by the measuring-wheel 5 the spur-wheel 9 will be turned one graduation, so as to indicate every inch that is run off. The spur-wheel 9 measures one foot, as before described, by one complete revolution, and as it completes its revolution its tappet 13 will engage a tooth of the spur-wheel 14, and thereby turn said spur-wheel one tooth, so as to mark up, by means of said spur-wheel, one foot for every revolution of the wheel 9. The continuation of this operation will manifestly finally effect a complete revolution of the spur-wheel 14, and thereby cause the device to reach its limit of measurement; but it is obvious that the train of gears before described may be supplemented by others and the operation continued practically to an indefinite point. It is to be understood that the disk or wheel 15 is loose upon its support and receives this intermittent turning movement by means of the pin 13 on the collar of the wheel 9. The outer face of the disk or wheel 15 is provided, in addition to the eccentric finger-piece 16, with a pointer opposite its zero-mark and within the opening 20, so that this wheel may be turned readily and brought to the zero-point. In setting the device to start the operation of measuring the measuring-wheel 15 is run over a surface, such as one's hand, until the disk 11 is brought to the zero-point at the slot 23. Then the finger-piece 16 is grasped and the wheel or disk 15 brought to the zero-point, and the device is then ready to start measuring. Fractions of an inch may manifestly be determined when the surface has been measured by the distance between the pointer 19 and that portion of the wheel 15 which is in engagement with the said surface.

Having thus described the invention, what is claimed as new is—

A rotary measuring device, comprising a base-plate provided with a handle portion containing linear graduations and provided also with projecting posts, a measuring-wheel journaled on one of said posts and provided with a milled periphery adapted to project beyond the base-plate into contact with the surface to be measured, the outer face of said measuring-wheel being laid off in inches and fractions thereof, a spur-pinion fast on the outer face of said measuring-wheel, a spur-wheel mounted on another post of the base-plate and adapted to mesh with said pinion, said spur-wheel being provided with a collar and a ring upon said collar, said ring being laid off with indicating-numerals designating inches and the collar being formed with a tappet, and another spur-wheel mounted on the first-named post above the measuring-wheel and its pinion and arranged with its teeth adapted for engagement with said tappet, the outer face of said last-named spur-wheel being laid off in graduations designed to indicate one foot, a spring-detent arranged to engage the teeth of said last-named spur-wheel, means for securing said spring-detent in place, and a cover-plate arranged for attachment to the base-plate and provided with slots designed to expose the graduations of the said spur-wheel and the said ring, said cover-plate being provided with a pointed offset-lug extending into close proximity to the graduations of the measuring-wheel.

In testimony whereof I affix my signature in presence of two witnesses.

EDWARD G. KIMMELL. [L. S.]

Witnesses:
JAS. F. CARSKARLON,
T. T. HUFFMAN.